UNITED STATES PATENT OFFICE.

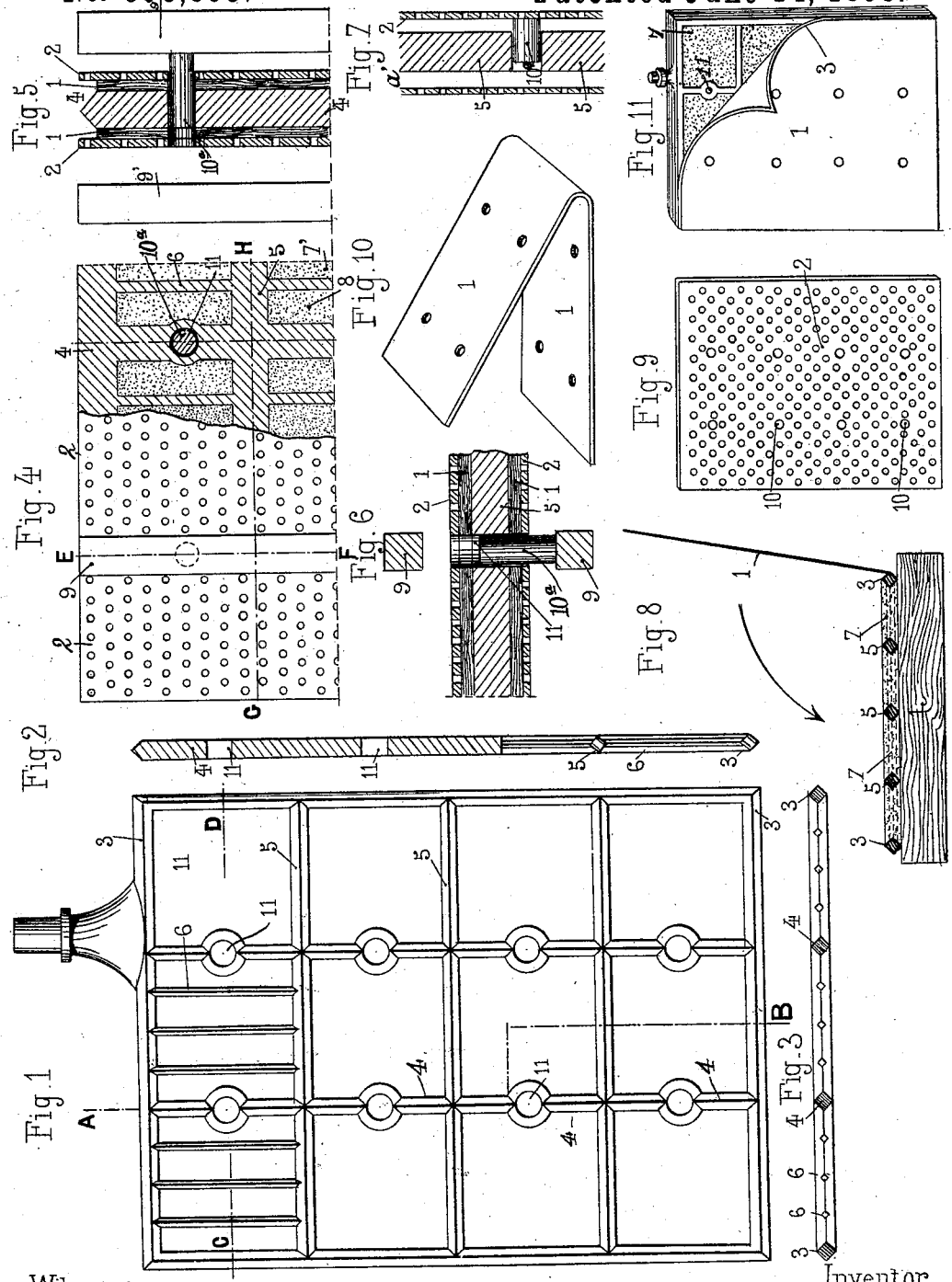

CAMILLE BRAULT, OF PARIS, FRANCE.

SECONDARY BATTERY.

SPECIFICATION forming part of Letters Patent No. 605,695, dated June 14, 1898.

Application filed December 28, 1896. Serial No. 617,256. (No model.) Patented in France August 14, 1895, No. 249,624; in Belgium January 10, 1896, No. 119,278; in England January 10, 1896, No. 719, and in Switzerland January 10, 1896, No. 11,873.

*To all whom it may concern:*

Be it known that I, CAMILLE BRAULT, a citizen of France, and a resident of Paris, in the Department of the Seine, France, have invented a new and useful Improvement in Secondary Batteries, (for which I have obtained Letters Patent in France, No. 249,624, dated August 14, 1895; in Belgium, No. 119,278, dated January 10, 1896; in England, No. 719, dated January 10, 1896, and in Switzerland, No. 11,873, dated January 10, 1896,) of which the following is a specification.

The object of this invention is to provide an electrical accumulator or storage battery which, owing to its improved construction and arrangement, gives far better results than have hitherto been accomplished with electrical accumulators or storage batteries.

In electrical accumulators or storage batteries constructed in accordance with this invention the active material or material to be rendered active is retained in its supporting-frame grating or the like by a combination of two envelops or casings, one of which is made of asbestos cloth or fabric and is in direct contact with and completely surrounds the said active material or material to be rendered active, while the other envelop or casing consists of perforated celluloid plates (or plates of equivalent material, as hereinafter mentioned) which are retained in contact with the asbestos cloth or fabric, so as to prevent the active material or material to be rendered active from falling away and insuring the maintenance of the plane or level faces of the elements of each cell.

The invention will be best understood by reference to the accompanying drawings, in which—

Figure 1 is an elevation of the supporting-framework, showing two of the secondary frames provided with bars. Fig. 2 is a cross-section on the line A B, Fig. 1, of the supporting grating, framework, or skeleton of the plate, consisting of a main frame wherein stout transverse bars form secondary rectangular frames, which in their turn are fitted with somewhat thinner and shorter bars so arranged as to follow the direction of the passing current. Fig. 3 represents the same grating or the like in horizontal section on the line C D, Fig. 1, it showing clearly the shape of the thick bars, which serve to gage the thickness or depth of the plate to be formed. Fig. 4 illustrates one method of fitting the asbestos-cloth covering in position. Fig. 5 is a section upon the line E F in Fig. 4. Fig. 6 is a partial section taken upon the line G H in Fig. 4. Fig. 7 is a sectional view showing a modified form of connection for the plates which support the asbestos. Fig. 8 is a sectional view showing the means employed for filling the frame with active material and the manner of applying the asbestos fabric to hold said material in place. Fig. 9 is a perspective view showing one of the supporting-plates provided with openings for the ends of the connecting-rods. Fig. 10 is a perspective view of an asbestos sheet folded and perforated and ready for use. Fig. 11 is a perspective view showing a frame filled with active material and having the asbestos fabric applied, one corner of the latter being turned back to show the frame and filling.

The asbestos cloth 1, free from any organic, animal, or vegetable matter, is made in the shape of a seamless band or folded strip, as shown in Fig. 10, and the perforated celluloid is employed in the shape of sheets 2, Fig. 9, the dimensions of the perforations being only limited by the necessity of counteracting the loss of toughness or firmness which the asbestos cloth is liable to sustain in consequence of its prolonged immersion in the acidulated fluid. The envelop or casing need not be closed on all its sides. It is preferable to leave it open at its upper end and at each side, so as to readily allow of the expansion of the plate. It is then made of a single strip folded and suitably supported with cross bars or rods.

The grating or the like 3 is constructed of an alloy of lead and antimony and serves as a current-collector, and it may be made of various shapes according to the method of application of the active material that is adopted. Thus it may be arranged in the form of a rigid frame with longitudinal cross-pieces or tie-bars 4 and transverse cross-pieces or tie-bars 5, forming rectangles connected with other thinner cross-pieces or tie-rods 6, preferably arranged vertically, so as to follow the direction of the current, or it may be formed of a thin-ribbed and open-work sheet of lead or lead alloy, the thickness or depth of the plates being in all cases exactly determined by the size of the marginal parts and of the stout bars 4 and 5.

The active material (or material to be rendered active) 7 may be applied in the condition of paste, this condition being obtained by mixing and kneading any of the oxids of lead in acidulated water. In applying this material the supporting-grating or the like is placed upon one fold of the band of the asbestos cloth 1, such band being of a sufficient length to admit of its being folded also over the other side of the plate, as shown by the arrow in Fig. 8.

The active material or material to be rendered active is deposited thereon by pouring while it is in a fluid paste, it being then made level and smooth by means of a flat plate which should be brought exactly flush with the stout bars 4 and 5, which form a gage for determining the thickness or depth of the plate to be produced. The other portions of the asbestos cloth 1 are then folded down. The plate should then be examined to ascertain whether or not the active material or material to be rendered active has been applied in a satisfactory manner, and if it be deficient (which may be the case on the under side, where the stout bars have interfered with the proper application of the material) the supply is supplemented, the asbestos cloth being very readily removable from the paste or powder. After the active material or material to be rendered active has thus been applied both sides are covered by plates 2, of celluloid, hard rubber, or ebonite, or any other suitable material which is neutral or proof against the action of the acid, such material being in all cases perforated and kept tightly compressed and in close contact with the asbestos cloth, which they serve to strengthen. This result may be obtained by perforating the celluloid or equivalent material by means of a punch or other suitable tool, thus forming a number of small apertures 10, as shown in Fig. 9, into which cross-pieces or connecting-rods $10^a$, of the same material, are then inserted and secured to each plate, which may be done by means of a solvent of the material of which they consist, Fig. 6, or the two plates may be connected by means of small rods or bars 9, retained in position or made mutually to support each other by means of cross-pieces or connecting-rods $10^a$, fixed to the rods or bars 9, Fig. 6, instead of being secured to the plates, as in Fig. 6.

Eyes or recesses, such as are shown at 11, Figs. 1, 2, 5, and 6, may be formed in the process of casting the supporting-grating or the like, the cross-pieces or connecting-rods $10^a$, referred to, being inserted therein. The said cross-pieces or connecting-rods in all cases answer the double purpose of connecting to each other the two plates of material which serve to retain the asbestos and of gaging the thickness or depth of the plates. The faces are leveled or smoothed by the application of any suitable tool or appliance, and deformation during drying may be resisted by the application of a weight.

I do not claim either the envelop or casing of asbestos or the envelop or casing of celluloid or the like used separately, as this is well known, but only the combination of the two when united in the manner shown and described, thereby producing a compound casing in which the asbestos prevents the falling away of the active material and the celluloid or the like prevents deformation of the plate.

Having now particularly described and ascertained the nature of my said invention and in what manner the same is to be performed, I declare that what I claim is—

1. In an electric accumulator, or storage battery, a frame having secondary frames to receive the active material, a fabric of asbestos filaments free from extraneous matter, inclosing the same, perforated plates of celluloid to inclose and support the asbestos, and cross pieces or rods, of the same material as the plates, having their ends lying in openings in the celluloid plates and secured thereto by a solvent of the celluloid, substantially as described.

2. In an electric accumulator, or storage battery, the combination with a body of active material of an inclosing fabric of asbestos, an outer covering or inclosure of perforated neutral material and cross rods, or bars, lying in openings in the active material their ends being connected to the neutral plates by a solvent of the material of which said plates are composed, substantially as described.

In testimony whereof I have signed this specification in the presence of two subscribing witnesses.

CAMILLE BRAULT.

Witnesses:
 HIPPOLYTE JOSSE,
 GEORGES DELOM.